US010894481B2

(12) United States Patent
Reber et al.

(10) Patent No.: US 10,894,481 B2
(45) Date of Patent: Jan. 19, 2021

(54) CONCRETE BASE FOR FASTENING A METAL HOUSING

(71) Applicant: Dr. Ing. h.c. F. Porsche Aktiengesellschaft, Stuttgart (DE)

(72) Inventors: Volker Reber, Michelbach an der Bilz (DE); David Köhler, Bietigheim-Bissingen (DE); Christian Metzger, Tamm (DE); Bekim Basha, Böblingen (DE); Karsten Hähre, Dudenhofen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 249 days.

(21) Appl. No.: 16/025,105

(22) Filed: Jul. 2, 2018

(65) Prior Publication Data

US 2019/0016221 A1    Jan. 17, 2019

(30) Foreign Application Priority Data

Jul. 12, 2017   (DE) .................. 10 2017 115 635

(51) Int. Cl.
| | |
|---|---|
| *B60L 53/30* | (2019.01) |
| *H02G 3/08* | (2006.01) |
| *H02G 3/03* | (2006.01) |
| *H02G 3/18* | (2006.01) |
| *H02B 1/30* | (2006.01) |

(52) U.S. Cl.
CPC .............. *B60L 53/30* (2019.02); *H02B 1/305* (2013.01); *H02G 3/03* (2013.01); *H02G 3/081* (2013.01); *H02G 3/18* (2013.01)

(58) Field of Classification Search
CPC ......... B60L 53/30; H02B 1/305; H02G 3/081; H02G 3/03; H02G 3/18; E04C 1/39; E04C 1/397
See application file for complete search history.

(56) References Cited

U.S. PATENT DOCUMENTS

| | | | | |
|---|---|---|---|---|
| 2,188,419 | A * | 1/1940 | Saviteer | E04H 13/003 52/103 |
| 3,213,578 | A * | 10/1965 | Cash | H02G 3/121 52/220.1 |
| 4,422,269 | A * | 12/1983 | Giard | E04C 3/34 52/100 |
| 5,937,601 | A * | 8/1999 | McDonald | B44C 3/04 232/39 |
| 6,069,317 | A * | 5/2000 | Wagganer | H02G 3/088 174/650 |

(Continued)

FOREIGN PATENT DOCUMENTS

| | | |
|---|---|---|
| CN | 2927425 Y | 7/2007 |
| CN | 205406989 U | 7/2016 |

(Continued)

OTHER PUBLICATIONS

Chinese Office Action for Chinese Application No. 201810756565. 0, dated Apr. 29, 2020, 8 pages.

*Primary Examiner* — Joshua K Ihezie
(74) *Attorney, Agent, or Firm* — RatnerPrestia (57) ABSTRACT

A concrete base for fastening a metal housing includes a baseplate, two side parts and two intermediate panels. Also described is a corresponding use method and a corresponding metal housing.

5 Claims, 9 Drawing Sheets

(56) References Cited

U.S. PATENT DOCUMENTS

| | | | | |
|---|---|---|---|---|
| 6,207,894 B1* | 3/2001 | Reiker | ............... | E04B 9/006 |
| | | | | 174/503 |
| 6,253,519 B1* | 7/2001 | Daniel | ............... | E04B 2/44 |
| | | | | 52/591.1 |
| 10,554,031 B1* | 2/2020 | Foote | ............... | H02G 3/16 |
| 2015/0255967 A1* | 9/2015 | Pawluk | ............... | H02B 1/20 |
| | | | | 174/16.1 |
| 2018/0010337 A1* | 1/2018 | Giarritta | ............... | E04C 1/00 |

FOREIGN PATENT DOCUMENTS

| | | |
|---|---|---|
| DE | 1894369 U | 6/1964 |
| DE | 29510748 U1 | 9/1995 |

* cited by examiner

CONCRETE BASE FOR FASTENING A METAL HOUSING

CROSS-REFERENCE TO RELATED APPLICATION

This application claims priority to German Patent Application No. DE 10 2017 115 635.6, filed Jul. 12, 2017, the content of such application being incorporated by reference herein in its entirety.

FIELD OF THE INVENTION

The present invention relates to a concrete base for fastening a metal housing. Moreover, the present invention relates to its use and to a corresponding metal housing.

BACKGROUND OF THE INVENTION

In electrical engineering, a charging station refers to any stationary apparatus or electrical installation which serves to supply energy to mobile battery-operated devices, machines or motor vehicles by a simple placing or plugging-in operation without the energy store—for instance the traction battery of an electric car—having to be removed. Charging stations for electric cars are occasionally also referred to as "electric filling stations" and can comprise a plurality of charging points.

Known here are in particular direct-current quick-charging systems (high performance charging, HPC) in accordance with IEC 61851-23 such as the so-called combined charging system (CCS) which is widespread in Europe. In the case of the generic direct-current charging, direct current is fed directly into the vehicle from the charging column and for this purpose provided by a high-power rectifier from the electricity network or by large buffer accumulators at solar filling stations. Buffer accumulators can also be locally connected in the electricity network of the network operator in order to stabilize the electricity network. As a rule, there is an OBC (On Board Charger) control device in the vehicle. This control device communicates with the charging column and the battery management control device.

Here, the power electronics is customarily in the charging column. Since the direct-current connections of the charging column are directly connected to corresponding connections of the traction battery, low-loss high charging currents can be transmitted, which allows short charging times but also generates a considerable heat loss.

DE29510748U1, which is incorporated by reference herein, describes a hollow column for mounting electrical components and for connecting electrical devices situated outside the column, comprising a column base, a column body and a covering element, wherein the column body is composed of column body elements and is connected to the column base and to the covering element and the column body elements are connected to one another, the upper end of the column base and of the column body elements and the underside of the covering element and of the column body elements are designed as connecting means and the upper and lower connecting means are complementary to one another in an identical manner.

DE1894369U, which is incorporated by reference herein, discloses a concrete base for cable distribution boxes which can be composed of a plurality of prefabricated parts, said base comprising a baseplate, a removable front panel and a plurality of parts which are placed above one another and are U- or C-shaped when seen in plan view, which parts, in the assembled state of the base, are securely held on the baseplate or bottom plate against displacement with respect to one another through the shape of the mutually facing sides of the parts, and receive the front panel between the free legs of the upper parts.

U.S. Pat. No. 4,422,269A, which is incorporated by reference herein, proposes a concrete core for masonry.

The proposed solution described herein is based on the finding that constituent parts of a charging park installation can be accommodated in metal housings which are separate from the charging column and which in turn require a suitable fastening. It must allow an introduction and optionally, but preferably, a fastening of any electricity and cooling lines, offer protection against small animals and allow the drainage of condensate from the metal housing. There must also be considered the required transportation of the base to the erection site, the prevention against break-ins and the provision of sufficient bending space with consideration to the smallest possible bending radius of the lines used.

The advantage of a concrete base according to aspects of the invention accordingly lies in its many possibilities of line routing from at least two sides, allowing metal housings placed thereon to be able to be installed close to walls of adjoining buildings or of other installations, next to one another or back to back. Here, a separation of inlet and outlet lines is just as conceivable as the lateral introduction of lines into the concrete base with right-angled bending in the upward direction while maintaining defined maximum bending radii. Also advantageous is the fixing of the electricity or coolant lines to the base in order to avoid twisting and to allow a simple installation. Finally, its structure as described below simplifies the transportation of the base to the intended erection site.

Further advantageous refinements of the invention are specified in the dependent patent claims.

BRIEF DESCRIPTION OF THE DRAWINGS

An exemplary embodiment of the invention is illustrated in the drawings and described in more detail below.

DETAILED DESCRIPTION OF THE INVENTION

Figure 1:
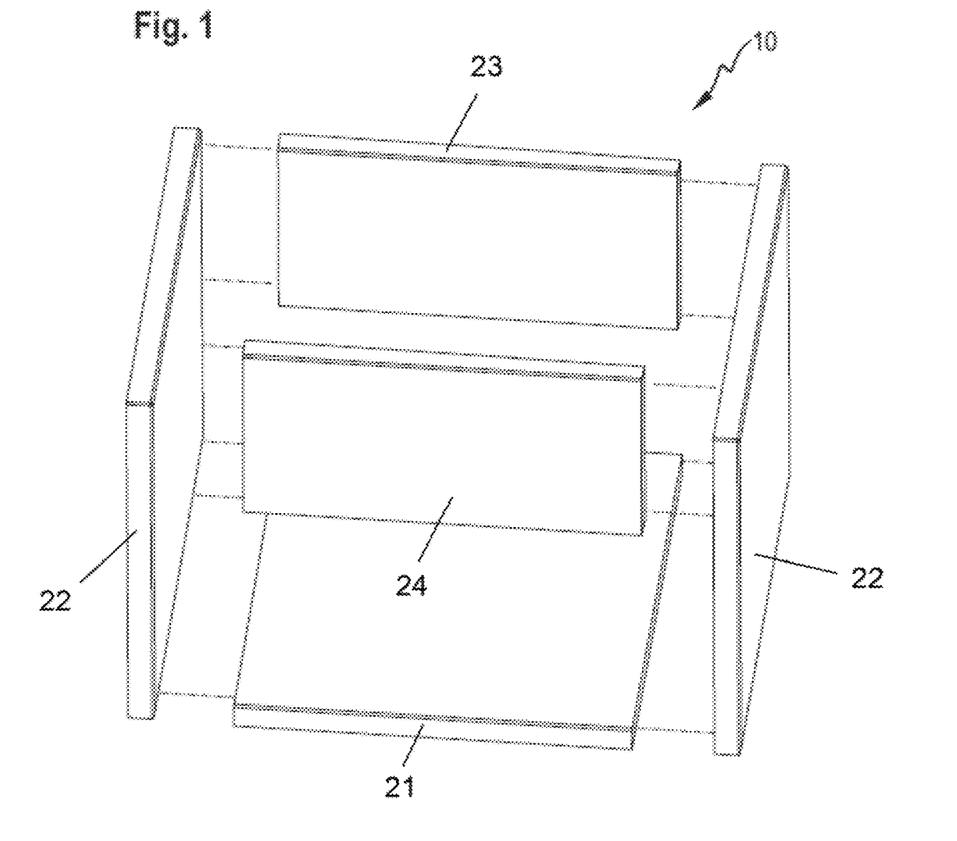
FIG. 1 shows the exploded illustration of a concrete base according to aspects of the invention.
Figure 2:
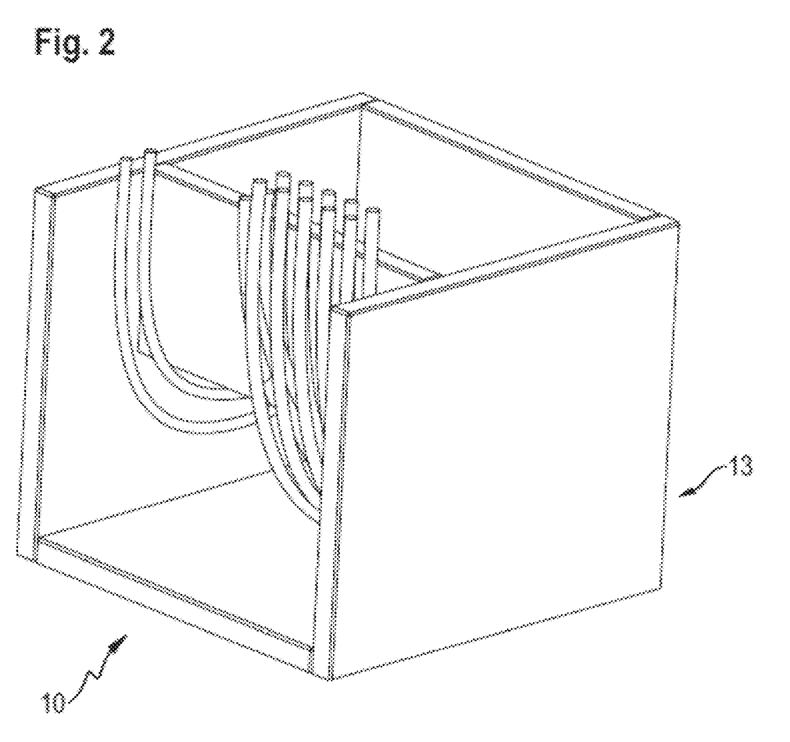
FIG. 2 shows a first view of the base equipped with lines.
Figure 3:
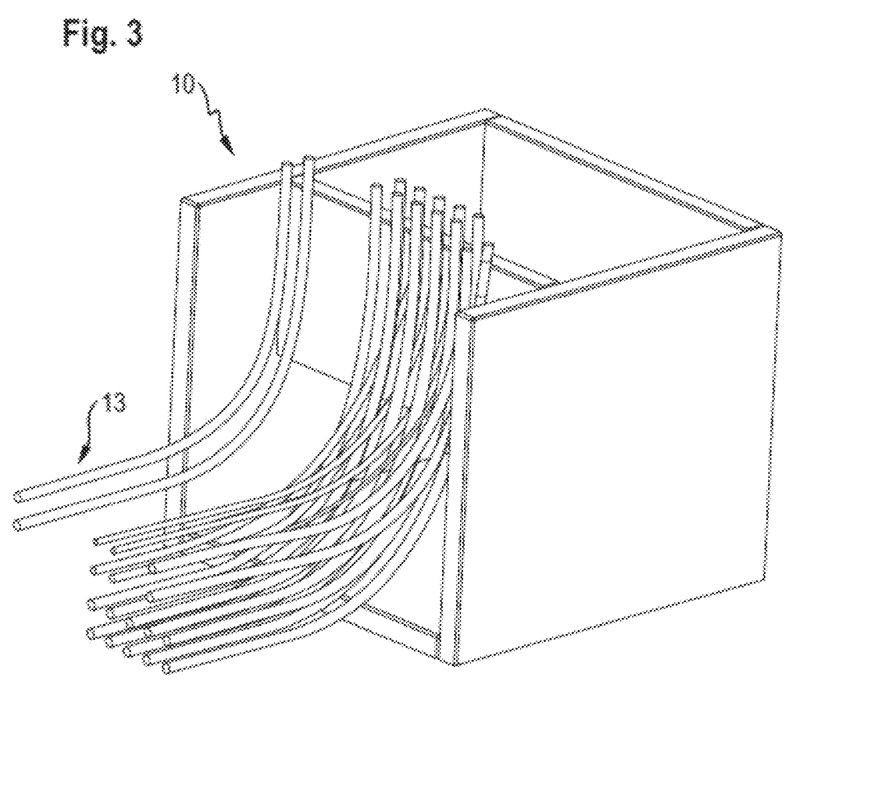
FIG. 3 shows a second view of the base equipped with lines.
Figure 4:
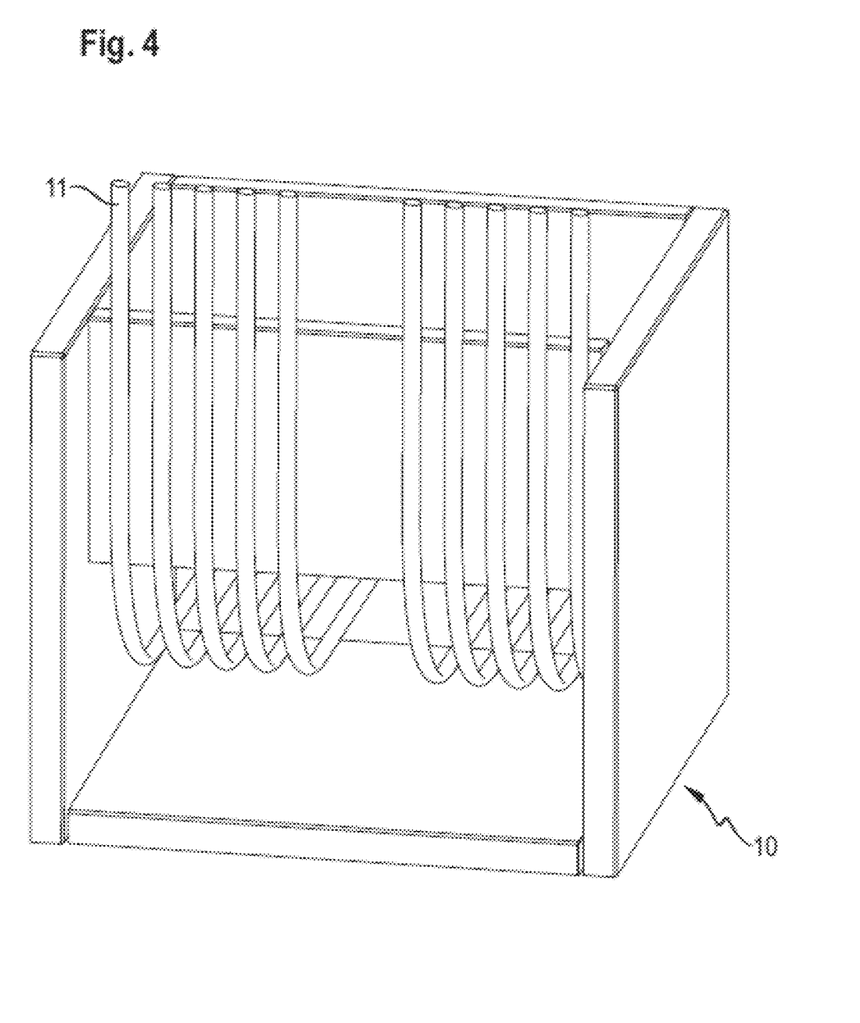
FIG. 4 shows the first method phase of a use of the base.

FIG. 1 illustrates the basic structure of a concrete base (10) according to aspects of the invention that is made up of a baseplate (21), two side parts (22) of approximately equal height and intermediate panels (23, 24), with one to the rear and one to the front according to the drawing. Whereas, here, both intermediate panels (23, 24) terminate flush with the upper edge of the side parts (22), only the rear intermediate panel (23) is also arranged flush with the coinciding rear edge of the side parts (22). By contrast, the front intermediate panel (24) is offset rearwardly from the front edge of the side parts (22) in order to be able to receive line clamps (14) for introducing lines. In order that these lines (13) can be introduced into the concrete base (10) either from the front side or rear side, the height of the intermediate panels (23, 24) corresponds only in each case to about 40% of the height of the side parts (22); the resulting possibility of choices is illustrated by FIGS. 2 and 3 when considered together.

Figure 5:
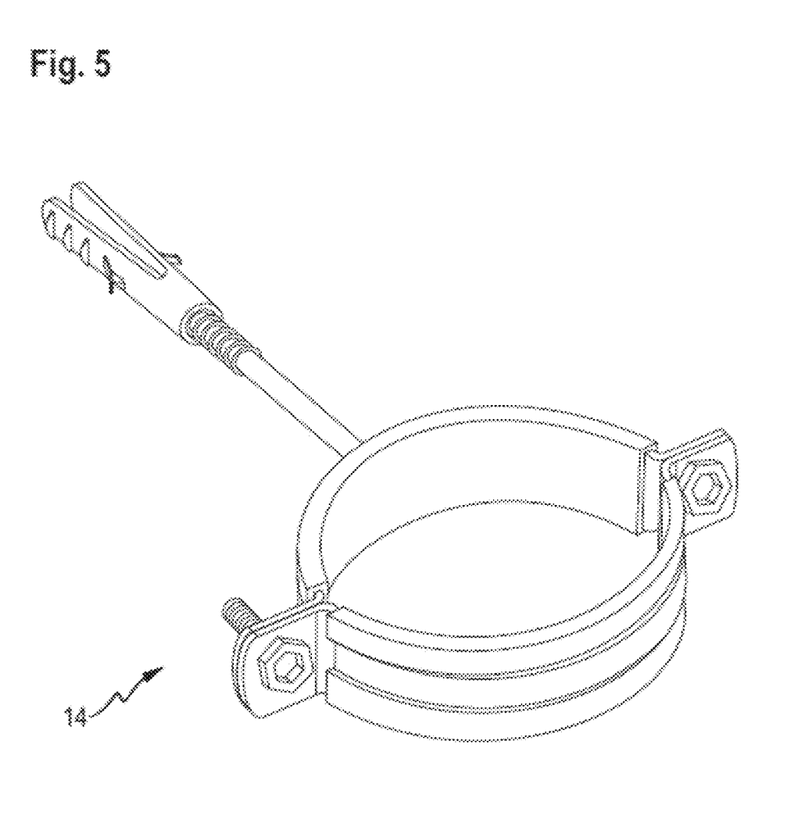
FIG. 5 shows the perspective view of a line damp.
Figure 6:
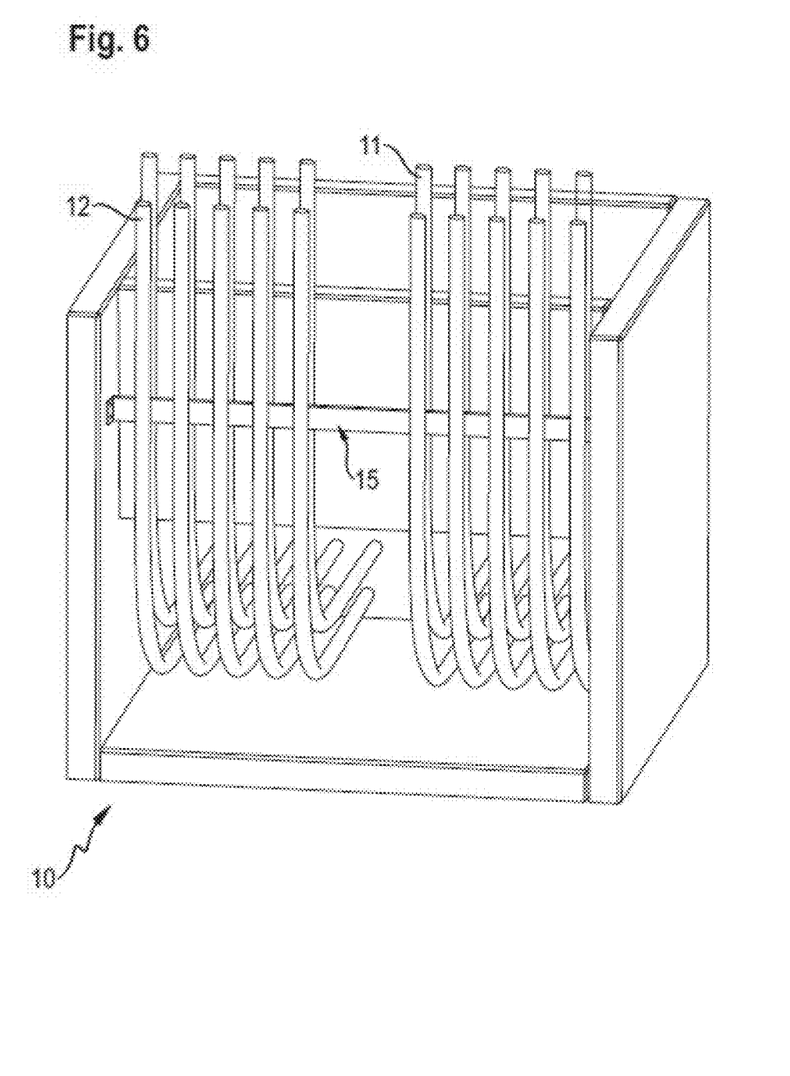
FIG. 6 shows the second method phase of the use of the base.

FIGS. 4 and 6 to 9 highlight the possible use of this concrete base (10) with the use of line clamps (14) of the form represented in FIG. 5 or of a similar form. A first row (11) of the lines (13) is fastened in the position according to FIG. 4 by these line clamps (14)—which are not graphically illustrated in the following method steps in order to simplify the drawing. In addition, a line holder (15) is optionally, but preferably, mounted in front of the first row (11) between the side parts (22), in front of which line holder a second row (12) of lines (13) can be fastened in turn with further line clamps (14) of said type (FIG. 6). This line holder (15) is also not illustrated in the subsequent drawings.

Figure 7:
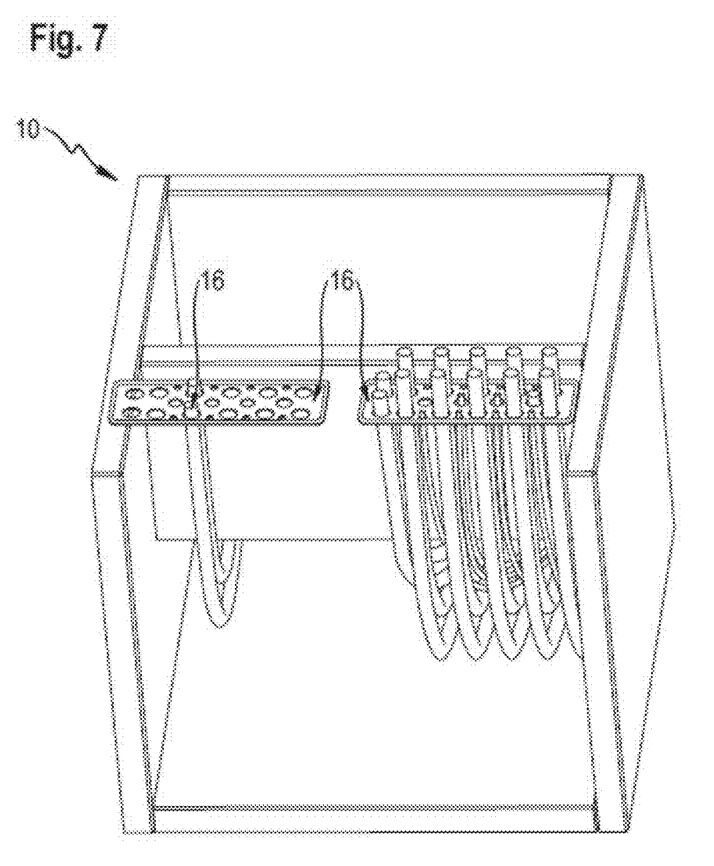
FIG. 7 shows the third method phase of the use of the base.
Figure 8:
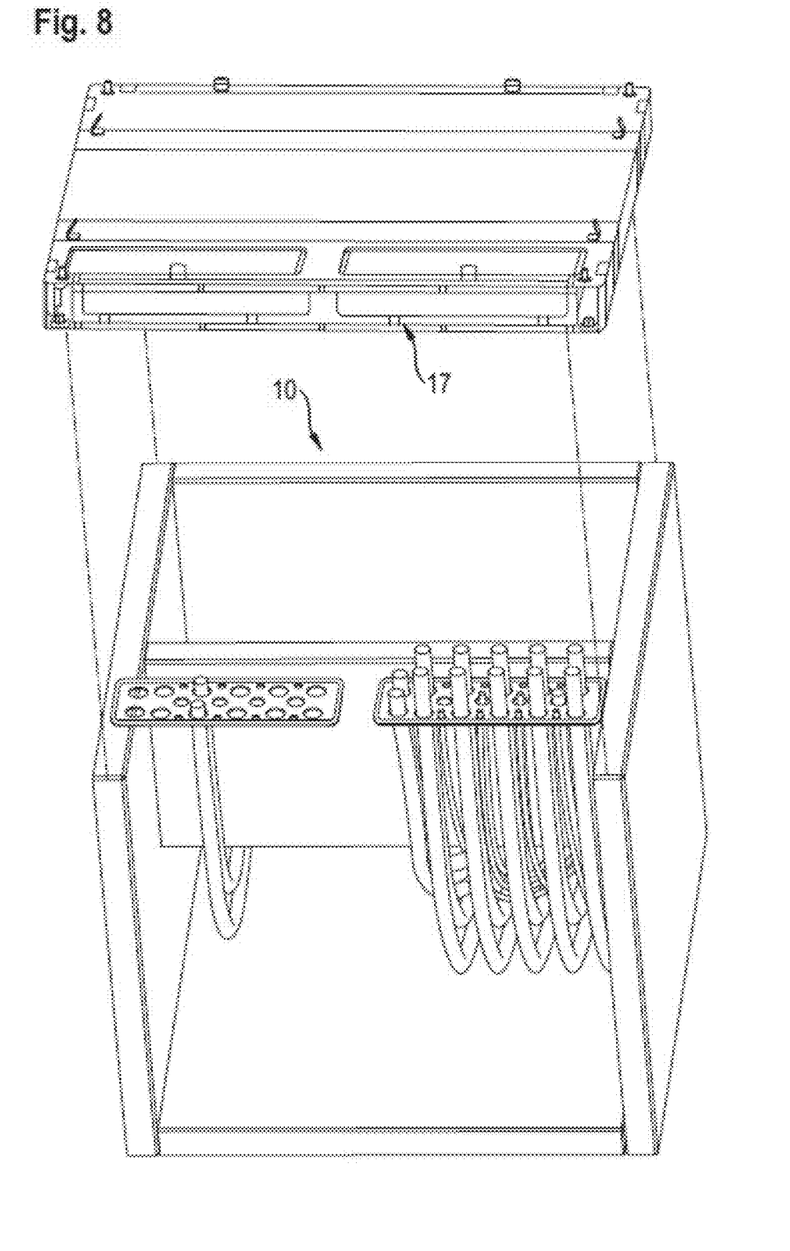
FIG. 8 shows the fourth method phase of the use of the base.

Sealing plates (16) are then placed on the lines (13) in such a way that the lines (13) project from below through the sealing plates (16) out of the concrete base (10) (FIG. 7) before the baseplate (17) of the metal housing itself is fastened on the concrete base (10) (FIG. 8) in such a way that the sealing plates (16) bear flat against the baseplate (17) and thus seal the components accommodated by the metal housing with respect to the moisture of the ground. Dependent on the respective intended use, for instance for coolant or as electric earth cables, the lines (13) in this end state can optionally be provided, for example, with valves (18), flexible shrink tubes (19) or cable shoes (20) (FIG. 9) before or after the base is at least partially filled by a fill of excavated material, sand or expanded clay.

Figure 9:
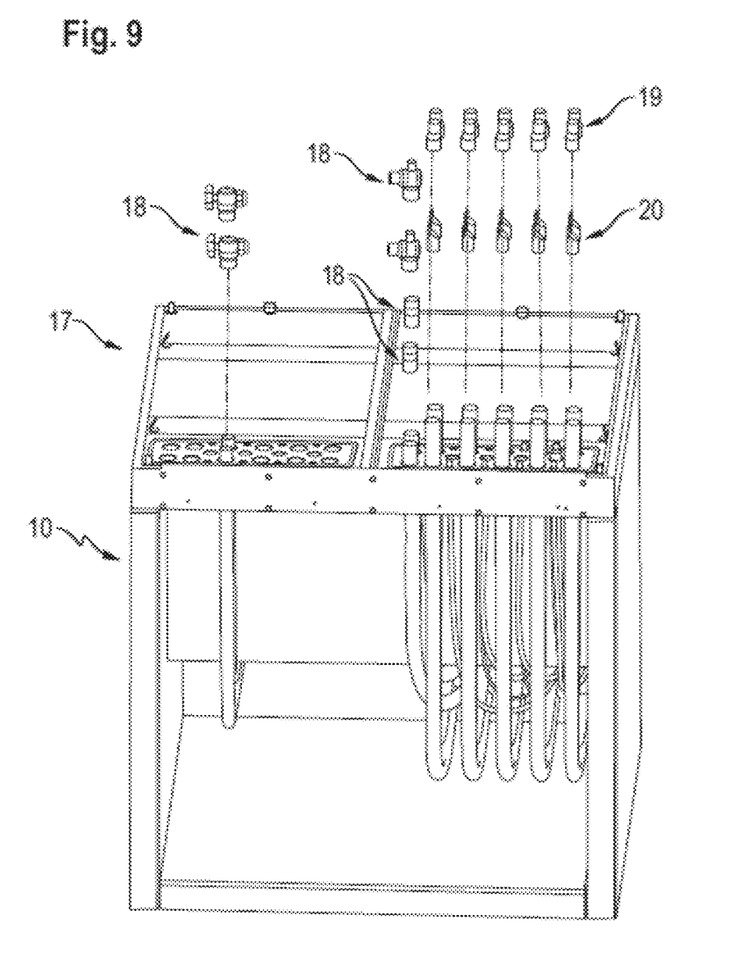
FIG. 9 shows the fifth method phase of the use of the base.

This configuration makes it possible for the line clamps (14) to be loosened if required and for the lines (13) fastened thereto to be connected to components in the metal housing by either being pushed back into the concrete base (10) or drawn out of the concrete base (10) as required.

What is claimed is:

1. A method of using a concrete base for fastening a metal housing, the concrete base including a baseplate, two side parts, a rear intermediate panel arranged flush with a rear edge of the two side parts and a front intermediate panel, the method comprising:
   introducing lines into the concrete base from a front side or a rear side of the concrete base,
   fastening at least a first row of the lines with line clamps, and
   at least partially filling the base with fill after the lines have been introduced, wherein the fill comprises excavated material, sand or expanded clay.

2. The method as claimed in claim 1, further comprising:
   installing valves in coolant lines under the lines,
   pressing cable shoes onto earth lines under the lines, and
   shrinking flexible tubes onto the earth lines.

3. The method as claimed in claim 1, further comprising:
   loosening the line clamps,
   connecting the lines to components in the metal housing, and
   wherein during the connecting step, the method comprises either pushing the lines back into the concrete base or drawing the lines out of the concrete base.

4. A method of using a concrete base for fastening a metal housing, the concrete base including a baseplate, two side parts, a rear intermediate panel arranged flush with a rear edge of the two side parts and a front intermediate panel, the method comprising:
   introducing lines into the concrete base from a front side or a rear side of the concrete base,
   fastening at least a first row of the lines with line clamps,
   mounting a line holder in front of the first row between the two side parts, and fastening a second row of lines in front of the line holder with further line clamps.

5. A method of using a concrete base for fastening a metal housing, the concrete base including a baseplate, two side parts, a rear intermediate panel arranged flush with a rear edge of the two side parts and a front intermediate panel, the method comprising:
   introducing lines into the concrete base from a front side or a rear side of the concrete base,
   fastening at least a first row of the lines with line clamps,
   placing sealing plates on the lines in such a way that the lines project from below through the sealing plates out of the concrete base, and
   fastening at least one baseplate of the metal housing on the concrete base in such a way that the sealing plates bear flat against the baseplate.

\* \* \* \* \*